United States Patent
Hanson et al.

(10) Patent No.: US 7,086,044 B2
(45) Date of Patent: Aug. 1, 2006

(54) METHOD, ARTICLE OF MANUFACTURE AND APPARATUS FOR PERFORMING AUTOMATIC INTERMODULE CALL LINKAGE OPTIMIZATION

(75) Inventors: Scott Patrick Hanson, Rochester, MN (US); Craig Arthur Orcutt, Mezeppa, MN (US); Robert Ralph Roediger, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 710 days.

(21) Appl. No.: 09/814,620

(22) Filed: Mar. 22, 2001

(65) Prior Publication Data
US 2004/0015925 A1    Jan. 22, 2004

(51) Int. Cl.
*G06F 9/45* (2006.01)
(52) U.S. Cl. .................. 717/151; 717/154; 717/157
(58) Field of Classification Search ............... 717/151, 717/153, 154, 157, 158, 162
See application file for complete search history.

(56) References Cited

U.S. PATENT DOCUMENTS

| 5,469,574 | A | * | 11/1995 | Chang et al. | 717/140 |
| 5,659,754 | A | * | 8/1997 | Grove et al. | 717/158 |
| 5,768,595 | A | * | 6/1998 | Gillies | 717/156 |
| 5,794,044 | A | * | 8/1998 | Yellin | 717/139 |
| 5,920,723 | A | * | 7/1999 | Peyton et al. | 717/157 |
| 5,940,620 | A | * | 8/1999 | Graham | 717/158 |
| 6,014,518 | A | * | 1/2000 | Steensgaard | 717/154 |
| 6,070,010 | A | * | 5/2000 | Keenleyside et al. | 717/154 |
| 6,085,035 | A | * | 7/2000 | Ungar | 717/153 |
| 6,427,234 | B1 | * | 7/2002 | Chambers et al. | 717/153 |

OTHER PUBLICATIONS

C for AIX, online information; IBM Corporation 1996-1998.
C/C++ User's Guide, Fourth Edition, Sep. 1998.

* cited by examiner

*Primary Examiner*—Wei Zhen
*Assistant Examiner*—Qamrun Nahar
(74) *Attorney, Agent, or Firm*—Patterson & Sheridan, LLP (57) ABSTRACT

A method, apparatus and article of manufacture for performing automatic intermodule call linkage optimization. In one embodiment, the run time is optimized for an object code generated from a source code. Initially, information is extracted for each procedure call in the source code. The extracted information is used to select a call linkage for each procedure call. The call linkages are selected to minimize the run time of the object code generated from the source code. Once the object code is generated form the source code, the object code is run using the selected call linkages for each procedure call.

29 Claims, 8 Drawing Sheets

| Procedure Unique ID # /402 | Module Name /404 | Procedure Name /406 | Argument Count /408 | Argument Types/Lengths /410 |
|---|---|---|---|---|
| 1 | A | calcsum | 3 | INTEGER/8, INTEGER/8, INTEGER/8 |
| 2 | A | calcprd | 3 | INTEGER/8, INTEGER/8, CHARPTR/8 |
| 3 | B | sum | 2 | INTEGER/8, INTEGER/8 |
| 4 | B | prd | 2 | INTEGER/8, INTEGER/8 |
| 5 | C | main | 0 | |

| Call Link ID # /412 | Caller Unique ID # /414 | Callee Unique ID # /416 | Argument Count /418 | Argument Types/Lengths /420 |
|---|---|---|---|---|
| 1 | 1 | 3 | 2 | INTEGER/8, INTEGER/8 |
| 2 | 1 | 3 | 2 | INTEGER/8, INTEGER/8 |
| 3 | 2 | 4 | 2 | INTEGER/8, INTEGER/8 |
| 4 | 2 | 4 | 2 | INTEGER/8, INTEGER/8 |
| 5 | 5 | 1 | 3 | INTEGER/8, INTEGER/8, INTEGER/8 |
| 6 | 5 | 2 | 3 | INTEGER/8, INTEGER/8, CHARPTR/8 |

Procedure Call:    prod (a, b )
Callee Procedure:  int prod ( int one, int two )

Fig. 9A

Allocate memory for parameters ( controlblock )
Store those parameters in memory ( already within registers )
    STORE a from register to controlblock
    STORE b from register to controlblock +8
Load controlblock register with address of control block
Branch to callee procedure
Retrieve address of control block from controlblock register
    LOAD one to register from controlblock
    LOAD two to register from controlblock +8
Continue on using values within registers

Fig. 9B

Copy parameters into parameter register ( already within registers )
    COPY a from register to parameter register 1
    COPY b from register to parameter register 2
Branch to callee procedure
    COPY one to register from parameter register 1
    COPY two to register from parameter register 2
Continue on using values within registers

Fig. 9C

METHOD, ARTICLE OF MANUFACTURE AND APPARATUS FOR PERFORMING AUTOMATIC INTERMODULE CALL LINKAGE OPTIMIZATION

BACKGROUND OF THE INVENTION

1. Field of the Invention

The invention relates to computers and computer software. More particularly, the invention relates to a method, article of manufacture and apparatus for performing automatic intermodule call linkage optimization.

2. Description of the Related Art

Computer systems run or execute software programs to implement a variety of functions. These software programs or computer programs are conventionally written in a high-level language, e.g., C++. In particular, C++ is an object-oriented programming language in which programs are created using abstractions and constructs to create user-defined classes for defining the methods and variables for a particular type of object. All objects of a particular class are identical in form and behavior but contain different data on their variables.

The text of a computer program written in such a high-level language is called a source code. However, to more efficiently run a computer program, the computer program is conventionally converted from source code to machine language. A compiler is a computer program that converts or, more particularly, compiles source code into machine language. A compiled version of the source code is called an object code.

As computer systems execute a variety of software programs, there is a need to reduce the amount of time required to execute these programs. Many compilers currently incorporate some type of optimization to minimize the time for program execution, i.e., run-time optimization. In one type of compiler optimization, known as "inlining optimization," the compiler replaces a call or invocation of a procedure with the instructions of the called procedure. By replacing the invocation of procedures, the inlining optimization eliminates the overhead required to call the procedure. However, if the source code or program contains many procedure calls, then inlining optimization considerably increases the amount of object code in the program.

An automatic implementation of run-time optimization is possible, but is limited to procedure calls in the same module in the source code or program. However, such an intramodule optimization fails to completely optimize a program having multiple modules.

An intermodule run-time optimization is implemented by storing certain parameters or variables in processor registers to eliminate the need to perform memory access during procedure calls or invocations. In this type of optimization, known as "argument optimization," a programmer must manually modify a program or source code to indicate which procedures within the code are to be optimized. However, manual modification of the source code is subject to human errors and is difficult to implement. Therefore, there is a need in the art to provide an automatic and intermodule compiler optimization.

SUMMARY OF THE INVENTION

The invention provides a method, apparatus and article of manufacture and apparatus for performing automatic intermodule call linkage optimization. In one embodiment, the run time is optimized for an object code generated from a source code. Initially, information is extracted for each procedure call in the source code. The extracted information is used to select a call linkage for each procedure call. The call linkages are selected to minimize the run time of the object code generated from the source code. Once the object code is generated form the source code, the object code is run using the selected call linkages for each procedure call.

An apparatus comprising a memory and a processor is also provided. The memory stores compiler program. The processor comprises a plurality of processor registers. Some of these processor registers are configured as parameter registers. The processor performs a method upon executing the compiler program. Information is initially extracted for each procedure call in a source code. The extracted information is used to select a call linkage for each procedure call. The call linkages are selected to minimize the run time of an object code generated from the source code. The object code is then generated form the source code.

Additionally, a computer readable medium storing a software program is provided. The software program, when executed by a computer, causes the computer to perform a method. Initially, information is extracted for each procedure call in the source code. The extracted information is used to select a call linkage for each procedure call. The call linkages are selected to minimize the run time of the object code generated from the source code. Once the object code is generated form the source code, the object code is run using the selected call linkages for each procedure call.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
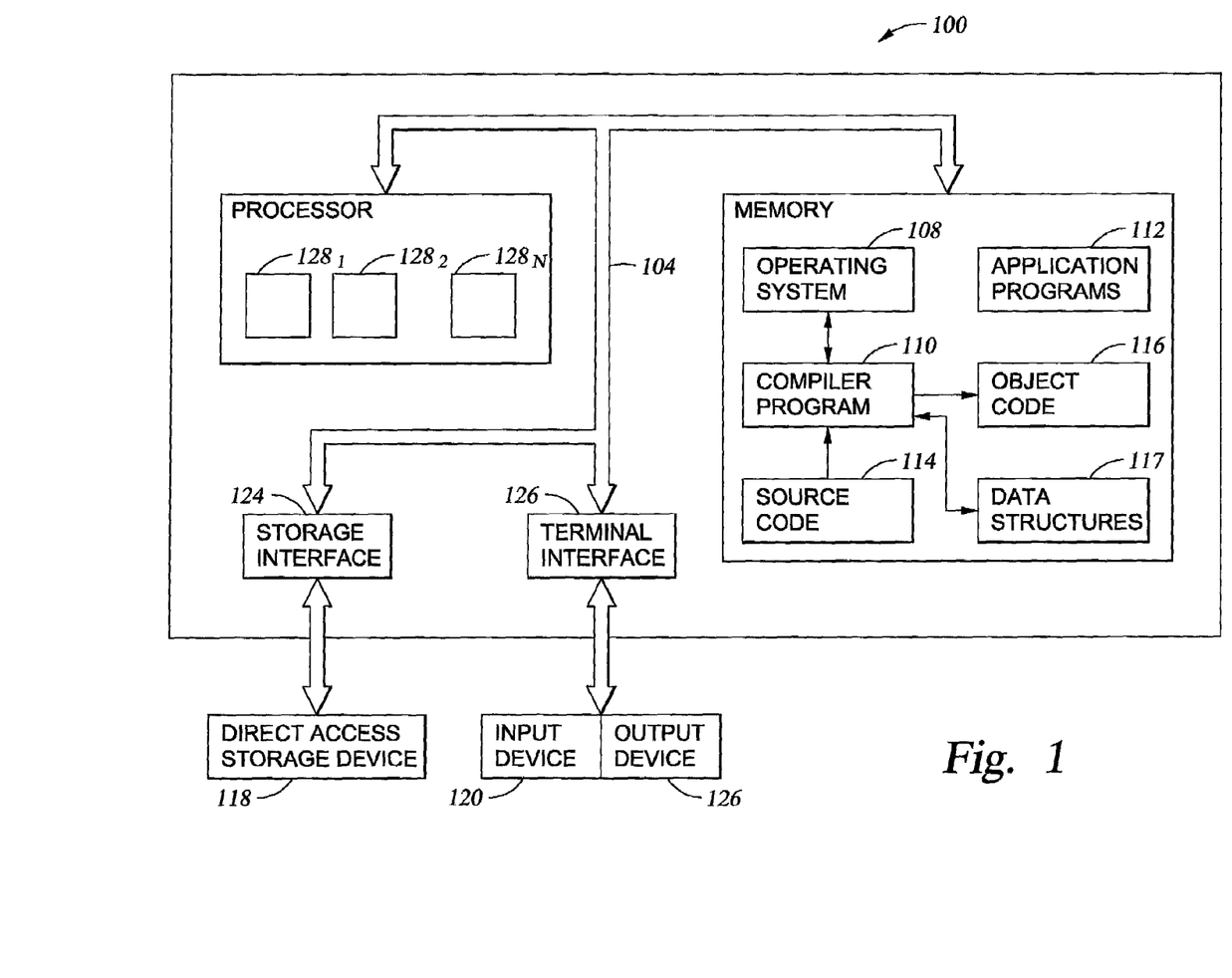
FIG. 1 depicts a block diagram of a computer system utilized to implement the present invention.

FIG. 1 depicts an illustrative computer system 100 utilized in accordance with the present invention. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an E-Server iSeries 400 or AS/400 available from International Business Machines of Armonk, N.Y.

The computer system 100 is shown in a programming environment having at least one processor 102, which obtains instructions and data from a main memory 106 via a bus 104. In one embodiment, the processor 102 may comprise a plurality of registers $128_1$, $128_2$, ..., $128_N$ (hereinafter $128_N$) for limited storage of information. A particular subset of these registers $128_N$ is used to physically implement procedure calls. This subset of registers $128_N$ is herein referred to as "parameter registers".

The main memory 106 includes an operating system 108, a compiler program 110 (hereinafter called "compiler"), and various application programs 112. Additionally, the memory 106 comprises source code 114, object code 116, and various data structures 117. The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. In one embodiment, the computer system 100 is illustratively coupled to a storage medium 118, input devices 120, and output devices 122. The storage medium 118 is operably coupled to the computer system 100 via a storage interface 124. One example of the storage interface is a disk drive, e.g., floppy drive, optical drive, tape backup, and the like. The input devices 120 and output devices 122 are coupled to the computer system 100 via an input/output interface 126.

The storage medium 118 may comprise either a permanent or removable direct access storage device (DASD). The input devices 120 may comprise any device utilized to provide input to the computer system 100. Examples of input devices 120 include a keyboard, a keypad, a light pen, a touch screen, a button, a mouse, a track ball, a speech recognition unit, and the like. The output devices 126 may comprise any conventional display screen. Although shown separately from the input devices 120, the output devices 126 and input devices 120 could be combined. For example, a display screen with an integrated touch screen, and a display with an integrated keyboard, or a speech recognition unit combined with a text speech converter could be used.

The operating system 108 is the software utilized to operate the computer system 100. Examples of the operating system 108 include IBM OS/400, UNIX, IBM AIX, Microsoft Windows, and the like. The compiler 110 is a software program that translates the source code 114 into the object code 116. More specifically, the compiler 110 analyzes the source code 114 and generates the data structures 117. The compiler 110 uses the data structures 117 to generate the object code 116. As such, the compiler 110 may be viewed as having a front-end and a back-end, in which the front end generates the data structures 117 from the source code 114 and the back-end generates the object code 116 from the data structures 117.

The source code 114 comprises one or more programs or files written in a programming language or some other code that the compiler 110 may translate into the object code 116. Examples of programming languages include Fortran, Ada, Cobol, Modula-2, Pascal, Java, Visual Basic, C, C+, C++, and the like. The object code 116 comprises one or more files or programs used by the operating system 108 or a particular application program 112.

One important feature in the compiler arts is to optimize the generation of object code 116 from the source code 114. Such optimization is implemented as a "program optimizer" function in the compiler 110. There are different modes or ways to optimize the compiler program 110. For example, the optimization may minimize the object code 116 generated from the source code 114. One embodiment provided herein optimizes the compiler program 110 by improving the runtime performance, e.g., minimizing the amount of time to execute the object code 116 generated from the source code 114. To minimize this runtime performance, the compiler program 110 selects a call linkage that is most efficient for each procedure call in the source code 114.

The call linkage represents a link or relationship between a procedure call (caller procedure) and a procedure that is called (callee procedure). In one embodiment, the compiler 110 selects between a memory-based call linkage and a register-based call linkage. The processor 102 performs different operations to implement these two types of call linkages. In the memory-based call linkage, the parameters or arguments of a procedure or subroutine call are "passed in memory." Namely, the arguments are initially stored from the registers $128_N$ to memory 106 and then loaded from memory 106 back to the registers $128_N$ when the compiler 110 performs a procedure call. In the register-based call linkage, the arguments of the procedure are copied to and from registers in the processor 102. A particular subset of registers $128_N$, called parameter registers, are used during a procedure call. One embodiment of a process to implement the memory-based call linkage is detailed in FIG. 9B and one embodiment of a process to implement the register-based call linkage is detailed in FIG. 9C.

The implementation of the memory-based call linkage requires the processor 102 to perform memory accesses for the storage and retrieval of parameter values. In contrast, the implementation of the register-based call linkage requires the processor 102 to access and copy parameter values to local registers in the processor 102. Given the current state of the art, memory access is much slower than the speed of the processor 102. Accordingly, the register-based call linkage is much faster than the memory-based call linkage under ideal conditions.

Although the compiler 110 in the above embodiment selected between a memory-based call linkage and a register-based call linkage, other embodiments may select among different classes of call linkages. Examples of such classes of call linkages include a "register stacks" call linkage, a "system" call linkage or "operating system" call linkage, and a "near versus far" call linkage. In the register stacks call linkage, a subset of registers $128_N$ is configured to operate as a stack. Frames or windows of registers are allocated on the stack for each procedure call or invocation and are popped from the stack on return from the procedure call. As such, the window may overlap during different procedure calls which allows the different caller and callee procedures to share information and eliminate the need to save and restore registers to and from memory 106 for each procedure call.

The system call linkage defines a link or relationship between system routines instead of a link between caller and callee procedures in a given programming language. Variations of the system call linkage include assigning different linkages to invoke an executable object code 116 and assigning different linkages for procedures written in different programming languages. In certain programming languages such as C or C++, a linkage may be specified with a #pragma statement, e.g., #pragma linkage (OS).

In the near versus far call linkage, different types of branching linkages are used depending on the distance in memory 106 between the caller and callee procedures. If the caller and callee procedures are separated within a threshold distance in memory 106, then a simpler branching linkage is implemented. If the caller and callee procedures are separated further apart in memory 106, e.g., different segments of memory 106 or different modules $202_1$, $202_2$ and $202_3$, then a more complex branching linkage is implemented.

However, there are certain conditions where the implementation of the register-based call linkage may result in additional run time delays over the memory-based call linkage. For example, if the number of parameters in a procedure call exceeds the number of parameter registers, the processing of the additional parameters may cause additional processing delays. In such a situation, the processor 102 would preferably use the memory based call linkage to implement the procedure call. In one embodiment, the compiler 110 determines the call linkages to improve the overall runtime performance of the compiler program 110.

In general, the routines executed to implement embodiments of the invention, whether implemented as part of an operating system or a specific application, component, program, object, module or sequence of instructions, are in the compiler program 110, (or "compiler" for short). The compiler 110 typically comprises one or more instructions that are resident at various times in various memory and storage devices in the computer system 100. When read and executed by one or more processors 102 in the computer system 100, the compiler 110 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution. Examples of signal bearing or computer readable media include, but are not limited to, recordable type media such as volatile and nonvolatile memory devices, floppy and other removable disks, hard disk drives, optical disks (e.g., CD-ROM, DVD, and the like), among others.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature. For example, the computer system 100 is depicted in a standalone environment, but is also applicable in a networked environment. In particular, the call linkages may be selected to optimize the run-time of the object code 116 for any computer in a computer network.

Figure 2:
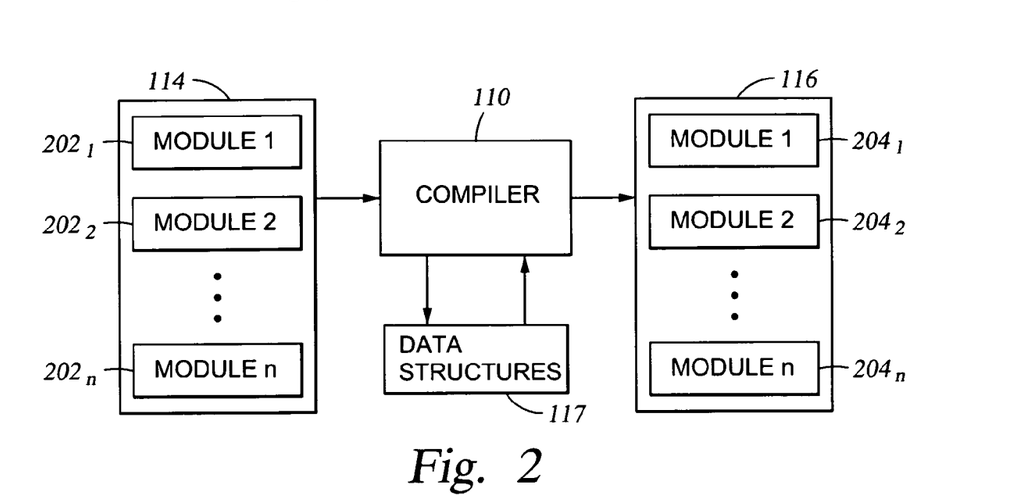
FIG. 2 depicts a conversion of a source code to an object code by a compiler program.

FIG. 2 depicts a conversion of a source code 114 to an object code 116 by a compiler program 110. The source code 114 comprises at least one source program that is generally written in a programming language interpreted and translated by the compiler 110. Specifically, the source code 114 may comprises of one or more modules illustratively $202_1$, $202_2$, ..., $202_n$ (hereinafter $202_n$). Each module $202_n$ represents a portion of the source code 114. The modules $202_n$ also contain procedure or subroutines that are analyzed by the compiler 110. An exemplary source code 114 is further detailed with respect to FIG. 3.

The compiler 110 analyzes the source code 114 to derive data structures 117. In the present invention, the data structures 117 are computer files that describe information pertaining to the source code 114. Specifically, the data structures 117 contain information on the procedures, modules, parameters or arguments, and any link or relationship between caller and callee procedures. One embodiment of the data structures 117 is further described with respect to FIGS. 4A and 4B.

The compiler 110 uses the data structures 117 to translate the source code 114 into the object code 116. The object code 116 comprises one or more modules $204_1$, $204_2$, ..., $204_n$ (hereinafter $204_n$). The number of modules $204_n$ in the object code 116 is not necessarily the same as the number of modules $202_n$ in the source code 114. In one embodiment, the compiler 110 analyzes the data structures 117 to determine the optimal call linkages for the caller and callee procedures that are not inlined. Such non-inlined procedures are not replaced with the instructions contained in the procedure by the compiler 110. The optimization applies to linkages between caller and callee procedures in different modules $202_n$ of the source code. By having the compiler 110 optimize the selection of call linkages in the source code 114, the present invention avoids the need for a user to manually indicate call linkages which is an error prone process.

Figure 3:
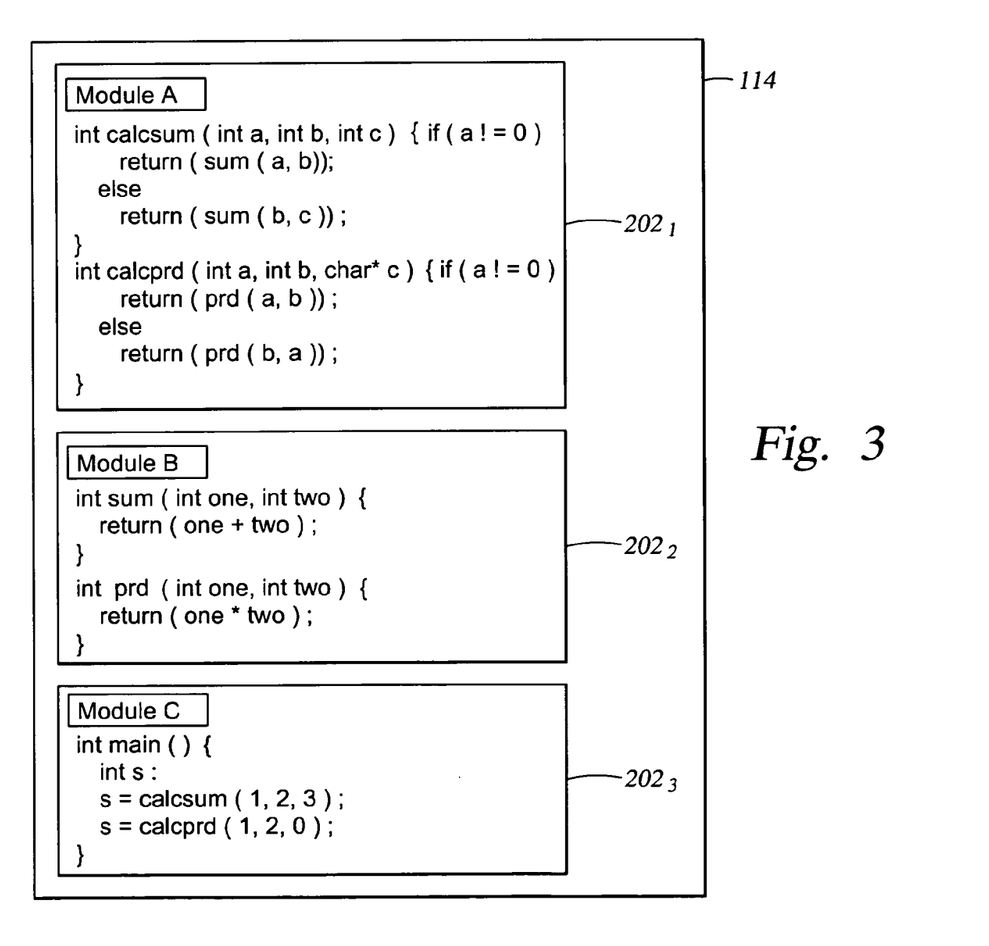
FIG. 3 depicts a representation of the source code of FIG. 2.

FIG. 3 depicts one representation of the source code 114. The source code 114 is generally written in a high-level programming language. The source code 114 is only exemplary in nature and does not limit the scope of the present invention. The source code 114 comprises three modules, module A $202_1$, module B $202_2$ and module C $202_3$. Each module $202_1$, $202_2$ and $202_3$ comprises procedures, i.e., procedure definitions, and procedure calls. For example, module A $202_1$ comprises procedures calcsum and calcprd, module B $202_2$ comprises procedures sum and prd, and module C $202_3$ comprises procedure main. Additionally, module A $202_1$ comprises four procedure calls including two procedure calls to the callee procedure sum and two procedure calls to the callee procedure prd. Module C $202_3$ comprises two procedure calls to the callee procedures calcsum and caclprd. These procedure calls may comprise intermodule calls. Namely, a procedure call in one module may call a procedure in a different module. For example, a procedure call of procedure calcsum is in module C $202_3$ which calls the procedure calcsum in module A $202_1$.

A "call linkage" relates each procedure call to its callee procedure. The call linkage defines a relationship between the caller and callee procedures in a procedure call. Two types of call linkages include a memory-based call linkage and a register-based call linkage. These call linkages are implemented during runtime of an object code 116 that is generated from the source code 114. The memory based call linkage requires memory accesses to execute a procedure call in the object code 116. The register-based call linkage uses parameter registers in the processor 102 to implement the procedure call. Exemplary implementations of the memory based and register based call linkages are further described with respect to FIGS. 9B and 9C.

Although the register based call linkage is ideally much faster, there are situations when the use of the register based call linkage may cause run time delays. For example, if the number of parameters in a procedure call is greater than the number of registers available, then using the register based call linkage may cause delays in processing the additional variables. The present invention provides an optimal selection of call linkages to minimize the overall run time of the object code 116.

Figure 4A:
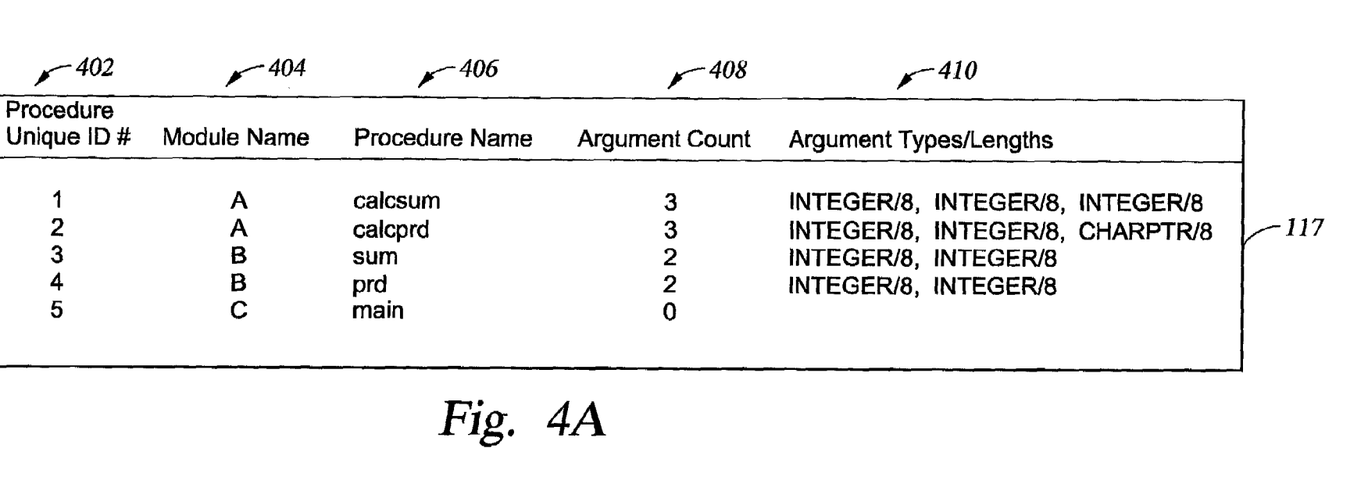
FIG. 4A depicts one data structure used to select call linkages for each procedure call.

FIG. 4A depicts one embodiment of a data structure 117 generated by the compiler 110. One possible format of the data structure 117 is a database table subject to a database query. The data structure 117 comprises information for each procedure or procedure definition in the source code 114. Illustratively, the data structure 117 comprises a procedure identifier field 402, a module field 404, a procedure name field 406, an argument count field 408 and an argument descriptor field 410. The procedure identifier field 402 comprises an identifier of a particular procedure. The value of this field 402 may be unique within the source code 114. The module field 404 comprises the name of a module $202_n$ containing a particular procedure. The procedure name field 406 comprises the name of a particular procedure. The argument count field 408 comprises the number of arguments or parameters in a particular procedure. The argument descriptor field 410 comprises information on the types of arguments specified in the argument count field 408.

Figure 4B:
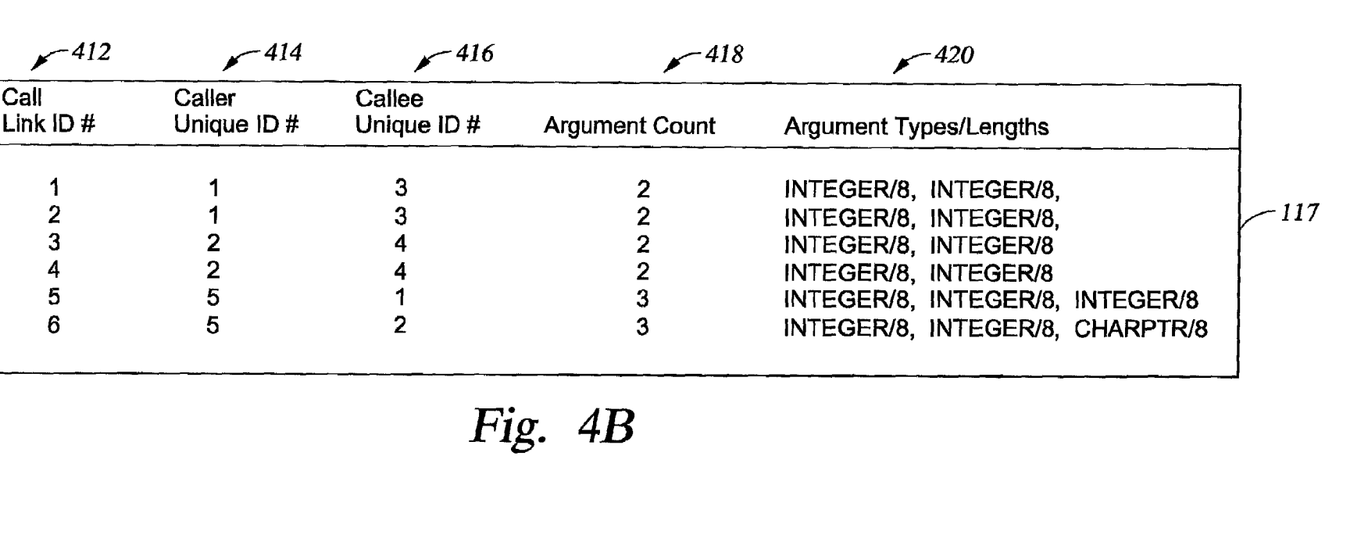
FIG. 4B depicts another data structure used to select call linkages for each procedure call.

FIG. 4B depicts another embodiment of a data structure 117 generated by the compiler. In contrast to FIG. 4A, the data structure 117 of FIG. 4B comprises information on the procedure calls or caller procedures. Illustratively, the data structure 117 comprises a call link identifier field 412, a caller procedure field 414, a callee procedure field 416, an argument count field 418 and an argument count field 420. The call link identifier field 412 comprises an identifier for a particular procedure call. The field 412 may be unique for the source code 114. The caller procedure field 420 comprises the identifier 402 of the procedure where the call was made from. If the procedure call is made outside any of the procedures, then either no value or a default value is assigned to the caller procedure field 420. The callee procedure field 416 comprises the identifier 402 of the callee procedure. The argument count field 418 comprises the number of arguments or parameters used in a particular procedure call. The argument descriptor field 420 comprises information on the types of arguments specified in the argument count field 418.

Figure 5:
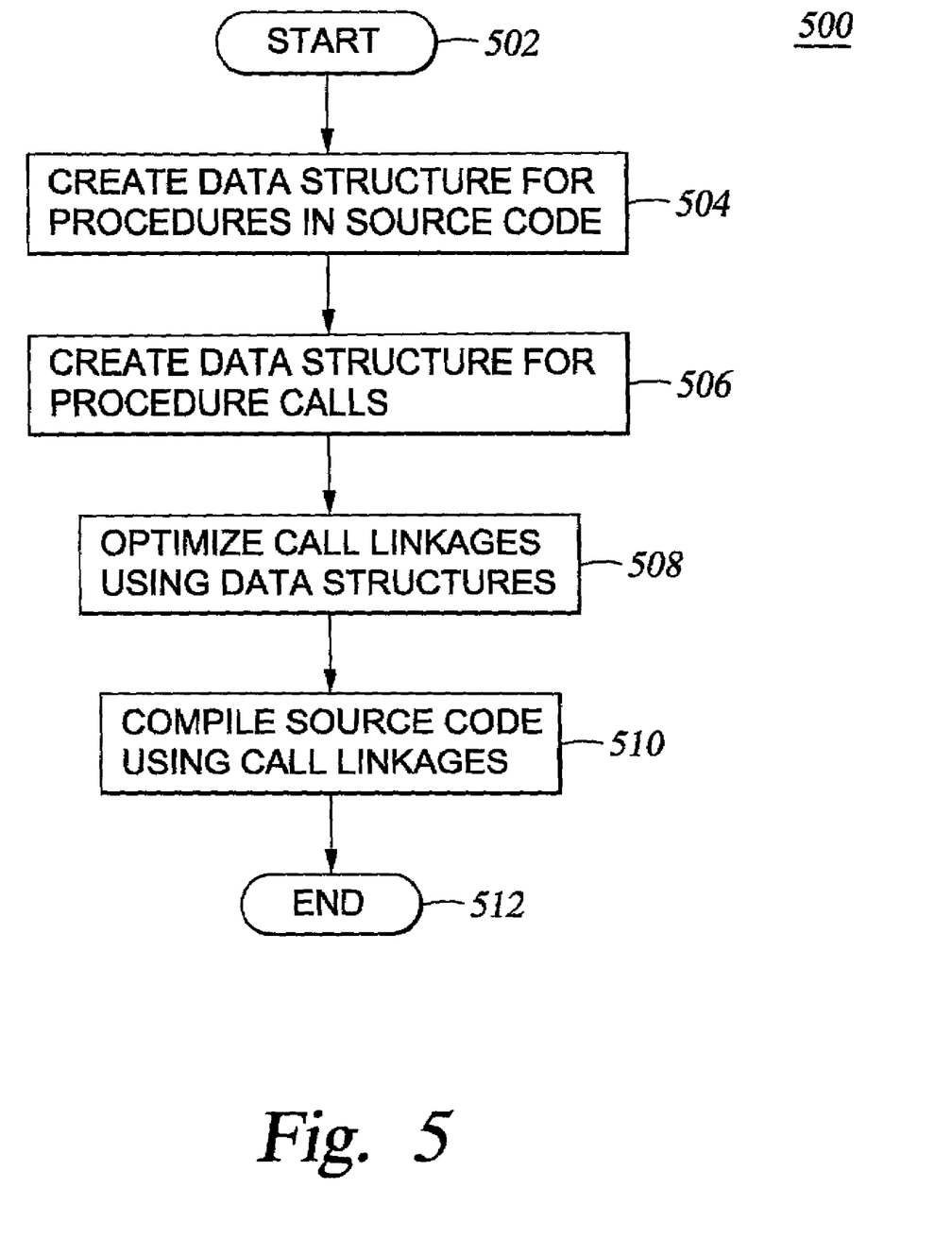
FIG. 5 depicts a flow diagram of a method for optimizing the run time of a generated object code.

FIG. 5 depicts a flow diagram of a method 500 for minimizing the run time of a generated object code by determining optimal call linkages in accordance to the present invention. In one embodiment, the method 500 is an Interprocedural Analysis (IPA) option of the compiler program 110. The method 500 starts at step 502 and proceeds to step 504, where data structures 117 are created for procedures in the source code 114. More specifically, step 504 extracts information about the procedures from the source code 114 and creates data structures 117 to include the extracted information. One embodiment of step 504 is further described with respect to FIG. 6. The method 500 proceeds to step 506, where data structures are created for procedure calls in the source code 114. More specifically, step 506 extracts information about the procedure calls from the source code 114 and creates data structures 117 to include the extracted information. The data structures 117 in step 504 contain different information than the data structures in step 506. As such, different files or different data structures may be created in steps 504 and 506. Step 506 is further described with respect to FIG. 7.

At step 508, the method 500 uses the data structures 117 to optimize the call linkages. More specifically, step 508 optimizes the call linkages by determining an appropriate call linkage for each procedure call, e.g., caller function and called procedure. The call linkages are optimized to minimize the overall run time of the object code 116 generated from the source code 114. Step 508 is further described with respect to FIG. 8. The method 500 proceeds generate the object code 116 from the source code 114 at step 510 and ends at step 512.

Figure 6:
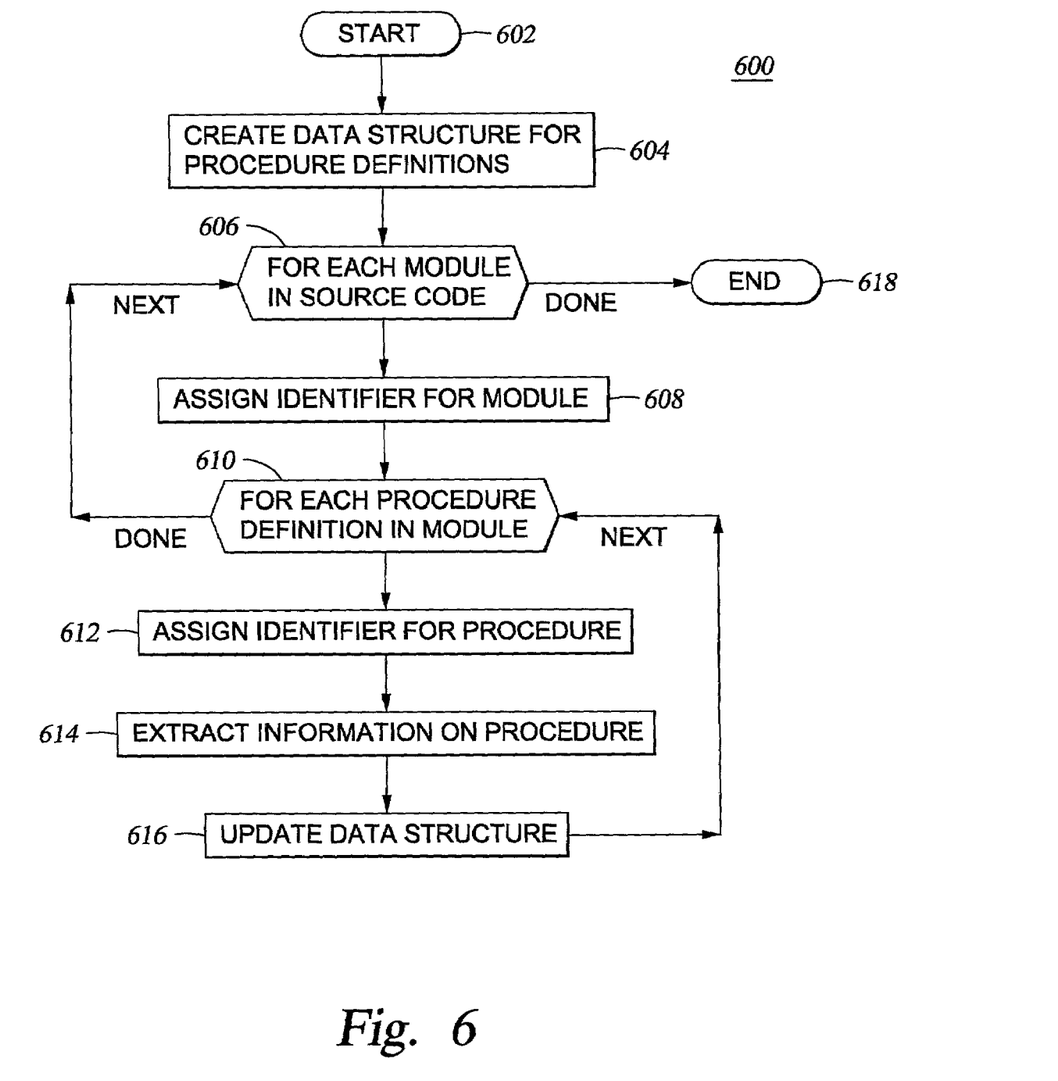
FIG. 6 depicts a flow diagram of a method for creating one embodiment of the data structure.

FIG. 6 depicts a flow diagram of a method for creating one embodiment of a data structure 117 used to optimize call linkages. The method 600 is embodied as step 504 described above with reference to FIG. 5. Specifically, the method 600 starts at step 602 and proceeds to step 604 where a data structure 117 is created for all procedures or procedure definitions in the source code 114. The method 600 proceeds to step 606 where a module $202_n$ in the source code 114 is considered. At step 608, an identifier is assigned for each module $202_n$. The method 600 proceeds to step 610 where a procedure in the module $202_n$ is considered.

At step 612, an identifier is assigned for the procedure. The method 600 proceeds to step 614 where information on the procedure is extracted. Such information may include, but is not limited to, the identifier of the module $202_n$ containing the procedure, the name of the procedure, the number of arguments or parameters in the procedure, and the types of arguments used in the procedure. The method 600 proceeds to update the data structure 117 with the extracted information at step 616 and returns to step 610 where the next procedure is considered. After all the procedures in a particular module $202_n$ are considered, the method 600 returns to step 606 where the next module $202_n$ is considered. After all the modules $202_n$ in the source code 114 are considered, the method 600 proceeds to end at step 618.

Figure 7:
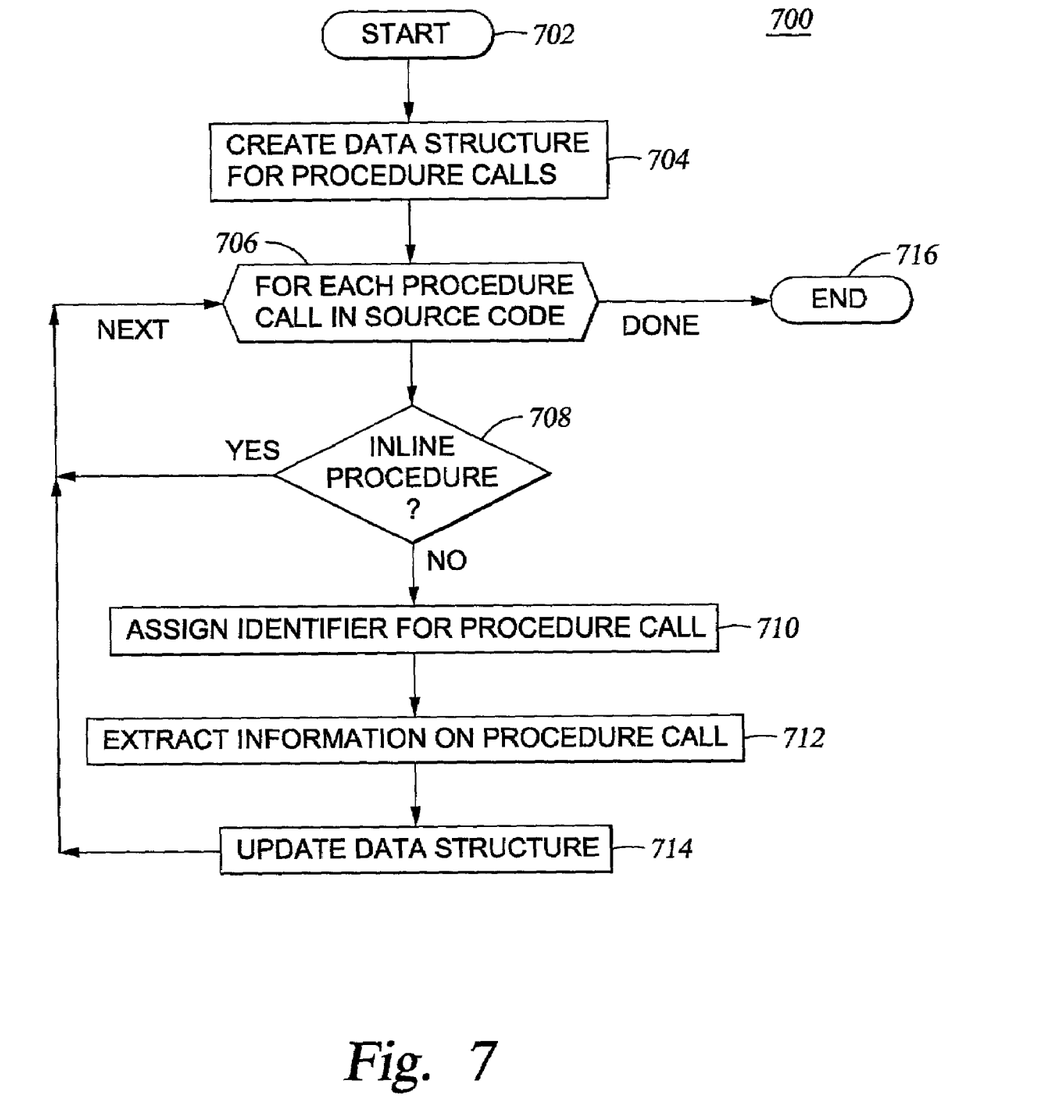
FIG. 7 depicts a flow diagram of a method for creating another embodiment of a data structure.

FIG. 7 depicts a flow diagram of a method 700 for creating another embodiment of a data structure used to optimize call linkages. The method 700 is embodied as step 506 described above with reference to FIG. 5. Specifically, the method 700 starts at step 702 and proceeds to step 704 where a data structure 117 is created for all procedure calls in the source code 114. At step 706, a procedure call in the source code 114 is considered. The method 700 proceeds to step 708 where a query determines whether the callee procedure in the procedure call is an inline procedure. If the callee procedure is an inline procedure, the method 600 returns to step 706 where the next procedure call is considered. It the procedure is not an inline procedure, the method 600 proceeds to step 710, where an identifier is assigned for the procedure call. The method 700 then proceeds to extract information on the procedure call from the source code 114 at step 712, update the data structure 117 with the extracted procedure call information at step 714, and return to the next procedure call in the source code 114 at step 706. Once all the procedure calls are considered, the method 700 exits at step 714.

Figure 8:
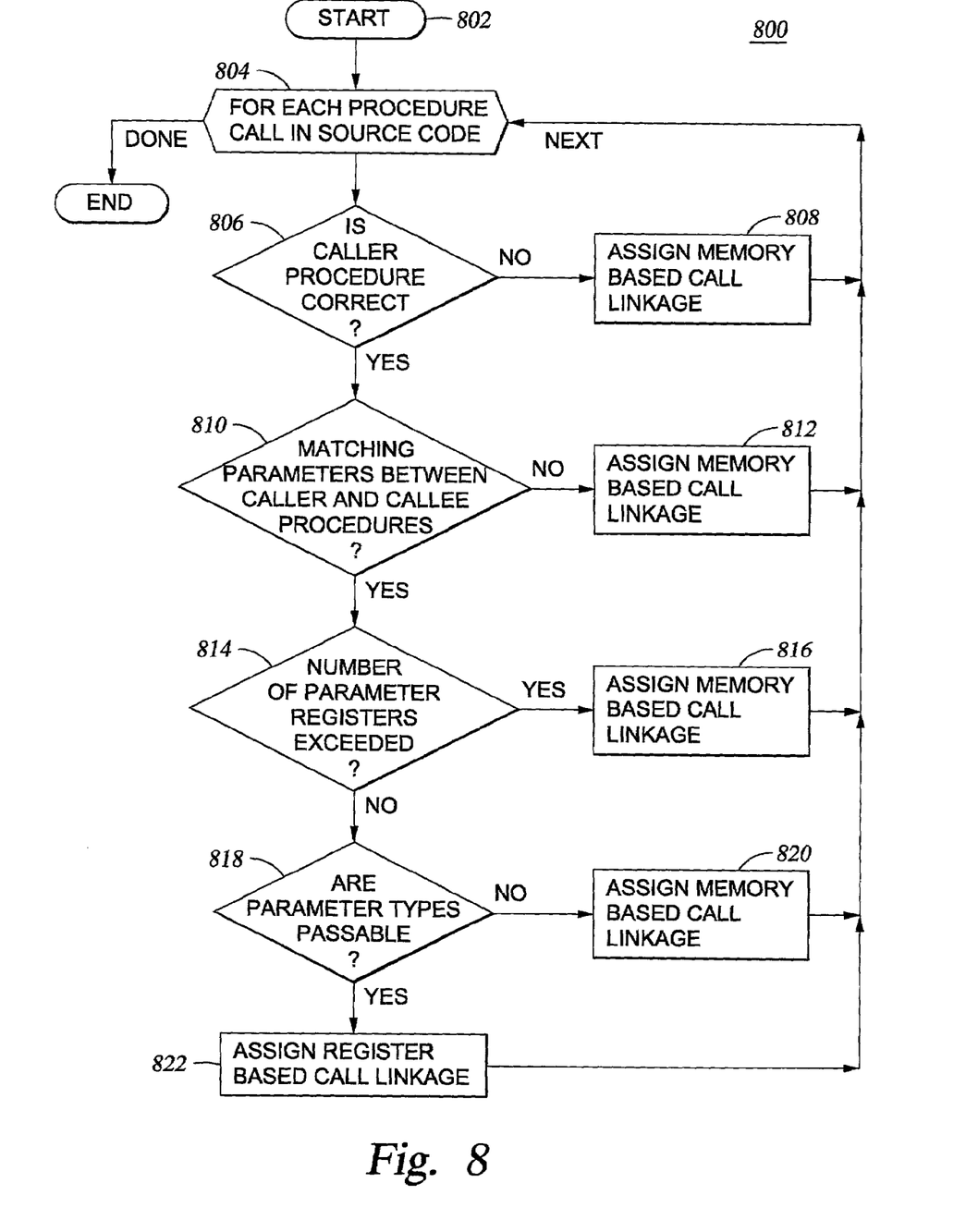
FIG. 8 depicts a flow diagram of a method for determining the optimal call linkages for each computer call.

FIG. 8 depicts a flow diagram of a method 800 for determining the optimal call linkages for each procedure call. The optimal call linkages will minimize the run time or execution time of a generated object code 116. The method 800 is embodied as step 508 described above with reference to FIG. 5. In one embodiment, the method 800 determines whether to assign a memory based call linkage or a register based call linkage to each procedure call or subroutine call. However, the present invention is not limited to the criteria and call linkages depicted in FIG. 8. Namely, the present invention may use other criteria and call linkages depending on the hardware and operating system 106 used in the computer system 100.

The method 800 starts at step 802 and proceeds to step 804 where each procedure call in the source code 114 is considered. The method 800 proceeds to step 806 where a query determines whether the procedure call is known. A procedure call may target an unknown callee procedure if the procedure call is made via a pointer, i.e., a procedure call through a procedure pointer, instead of a direct procedure call. In this situation, the callee procedure is considered unknown, since the value of the procedure pointer is not easily determined. If the procedure call is unknown, e.g., made to an unknown procedure, the method 800 proceeds to step 808 where a memory-based call linkage is assigned to the procedure call. One embodiment of implementing the memory-based call linkage is further described with reference to FIG. 9A. After step 808, the method 800 then returns to step 804 where the next procedure call in the source code 114 is considered.

If the procedure call is known, the method 800 proceeds to step 810, where a query determines whether the parameters in the procedure call or calling procedure matches the parameters of the callee procedure. In one embodiment, several conditions must exist for a match to occur. First, the calling and callee procedures must have the same number of parameters. Second, each parameter in the calling and callee procedures must have the same type of parameter and the same length. If the match does not exist, then the method 800 proceeds to assign a memory based call linkage at step 812 and returns to step 804.

If the match does exist, then the method 800 proceeds to step 814, where a query determines whether the number of parameters in the procedure exceeds the number of parameter registers in the processor 102. The parameter registers are a subset of the registers $128_N$ in the processor 102 that are used to perform a procedure call of the generated object code 116. Namely, step 814 determines whether the number of allocated parameter registers is sufficient to store all the parameters used in a procedure call. If the number of parameter registers is insufficient, the method 800 proceeds to assign a memory based call linkage at step 816 and returns to step 804.

If the number of parameter registers is sufficient, the method 800 proceeds to step 818 where a query determines whether all types of parameters in the procedure can be passed in the registers $128_N$. Certain types of data, e.g., pointers, which cannot be passed in a register $128_N$. If all parameters in the procedure are not passable, the method 800 proceeds to assign a memory based call linkage at step 820 and returns to step 804. If all parameters in the procedure are passable, the method 800 proceeds to step 822 where a register based call linkage is assigned. One embodiment of implementing the register-based call linkage is further described with reference to FIG. 9B. As such, the register-based call linkage is assigned only after satisfying a preconfigured set of conditions, e.g., in steps 806, 810, 814 and 818. The method 800 then returns to step 804. After all the procedure calls in the source code 114 are considered, the method exits at step 824.

However, the method 800 is not limited to the conditions in steps 806, 810, 814 and 818 of FIG. 8. Those skilled in the art would readily realize that a hybrid or partial call linkage implementation is also capable. For example, if the number of arguments in a procedure call exceeds the number of parameter registers in step 814, the method 800 may still implement a register-based call linkage by processing a number of arguments equivalent to the number of parameter registers.

Figure 9A:
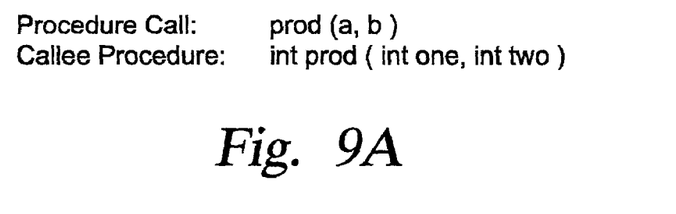
FIG. 9A illustrates exemplary pseudo-code for a procedure call and illustrates a procedure declaration of the procedure called by the procedure call.

FIG. 9A depicts an exemplary process to implement a procedure call using a memory-based style of call linkage. The implementation of the procedure call is performed during execution of the object code 116. In the memory-based style of call linkage, memory is initially allocated for parameters in the procedure call. The values of the parameters are stored from the registers $128_N$ in the processor 102 to specific control blocks in the memory 106. When the callee procedure is executed, the values are loaded back to the registers $128_N$ from the memory 106.

Figure 9B:
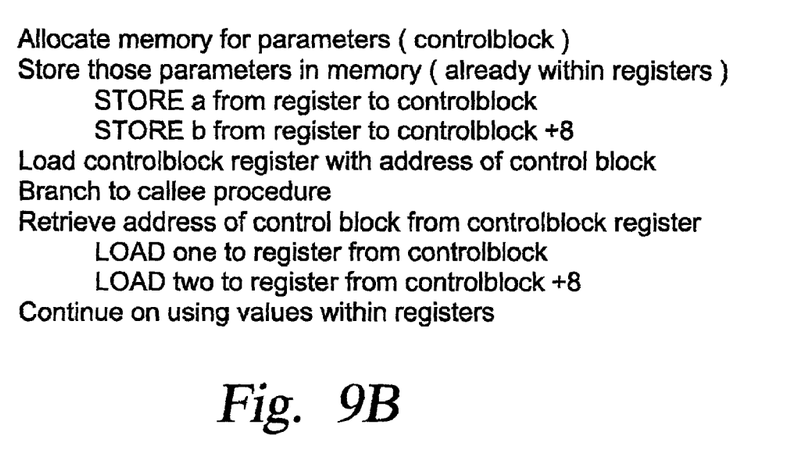
FIG. 9B depicts an exemplary process to implement a procedure call using a memory-based style of call linkage.
Figure 9C:
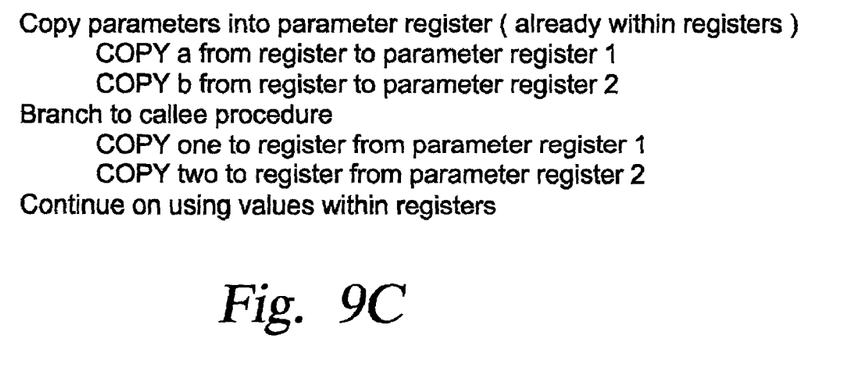
FIG. 9C depicts an exemplary process to implement a procedure call using a register-based style of call linkage.

FIG. 9B depicts an exemplary process to implement a procedure call using a register-based style of call linkage. In the register based call linkage, the values of the parameters are initially copied within the processor 102. Specifically, these values are copied from the registers $128_N$ to a particular subset of registers $128_N$ called parameter registers. The parameter registers are registers $128_N$ used for the specific purpose of implementing the procedure call. Some or even all of the registers $128_N$ are parameter registers. In some cases, no copy is required from the registers $128_N$ to the parameter registers. When the callee procedure is executed, the values are copied back to the registers $128_N$ from the parameter registers. In contrast to the memory-based call linkage, the register-based call linkage is usually faster under ideal conditions, since no memory access is required for parameters.

Although various embodiments which incorporate the teachings of the present invention have been shown and described in detail herein, those skilled in the art can readily devise many other varied embodiments that still incorporate these teachings.

What is claimed is:

1. A method for optimizing a run time for an object code generated from a source code, the method comprising:
   extracting information for each procedure call contained in the source code;
   selecting a call linkage between a caller procedure and a callee procedure for each procedure call using the extracted information, where the selected call linkage is optimized to minimize the run time of the object code generated from the source code;
   generating the object code from the source code; and
   running the object code using the selected call linkages for each procedure call.

2. The method of claim 1 wherein the selected call linkage is one of a memory-based call linkage and a register-based call linkage.

3. The method of claim 2 wherein, if the memory-based call linkage is selected for a particular procedure call, the running comprises:
   allocating a block in a memory to store a value for each argument in the particular procedure call;
   storing the value for each argument from a register in a processor to the block in the memory;
   branching the procedure call to a callee procedure; and
   loading the value for each argument from the block in the memory back to the register.

4. The method of claim 2 wherein, if the register-based call linkage is selected for a particular procedure call, the running comprises:
copying a value, for each argument in a procedure call, from a register in the processor to a parameter register in the processor;
branching the procedure call to a callee procedure; and
copying the value from the parameter register back to the register.

5. The method of claim 2 wherein the selecting comprises:
detecting whether an error exists for the procedure call;
selecting the memory based call linkage if the error is detected for the procedure call; and
selecting the register-based call linkage if no error is detected for the procedure call.

6. The method of claim 5 wherein the error is detected if the procedure call has a different number of parameters than the callee procedure.

7. The method of claim 5 wherein the error is detected if a parameter type for a parameter in the caller procedure is different than the parameter type for the parameter at a corresponding position in the callee procedure.

8. The method of claim 5 wherein the error is detected if a number of arguments in the procedure call is greater than a number of parameter registers used to run the object code.

9. The method of claim 5 wherein the error is detected if an argument in the procedure call is unpassable in a register.

10. The method of claim 1 wherein the extracting of procedure call information comprises:
extracting information for each procedure definition contained in the source code.

11. The method of claim 10 wherein the extracted procedure call information comprises an identifier for a calling procedure and a callee procedure, and the extracted procedure definition information comprises a number of arguments received by the callee procedure and a classification for each argument.

12. The method of claim 1 wherein the call linkage is selected in a class comprising one of a register stacks call linkage, a system call linkage and a near versus far call linkage.

13. The method of claim 1 wherein the extracted information is generated in a data structure used to select the call linkage for each procedure call.

14. An apparatus for optimizing a run time of an object code generated from a source code, the apparatus comprising:
a memory for storing a compiler program; and
a processor comprising a plurality of registers, where a subset of the plurality of registers comprise parameter registers, the processor performing a method upon executing the compiler program in the memory, the method comprising:
extracting information for each procedure call contained in the source code;
selecting a call linkage between a caller procedure and a callee procedure for each procedure call using the extracted information, where the selected call linkage is optimized to minimize a run time of an object code generated from the source code; and
generating the object code from the source code.

15. The apparatus of claim 14 wherein the object code is executed using the selected call linkage for each procedure call.

16. The apparatus of claim 14 wherein the determined call linkage is one of a memory-based call linkage and a register-based call linkage.

17. The apparatus of claim 16 wherein the selecting comprises:
detecting whether an error exists for the procedure call;
selecting the memory based call linkage if the error is detected for the procedure call; and
selecting the registered based call linkage if no error is detected for the procedure call.

18. The apparatus of claim 14 wherein the extracting of procedure call information comprises:
extracting information for each procedure definition contained in the source code.

19. The apparatus of claim 18 wherein the extracted procedure call information comprises an identifier for a calling procedure and a callee procedure, and the extracted procedure definition information comprises a number of arguments received by the procedure and a classification for each argument.

20. The apparatus of claim 14 wherein the extracted information is generated in a data structure used to select the call linkage for each procedure call.

21. A computer readable medium storing a software program that, when executed by a computer, causes the computer to perform a method comprising:
extracting information for each procedure call contained in a source code; and
selecting a call linkage between a caller procedure and a callee procedure for each procedure call using the extracted information, where the selected call linkage is optimized to minimize a run time of an object code generated from the source code;
generating a object code from the source code; and
running the object code using the selected call linkages for each procedure call.

22. The computer readable medium of claim 21 wherein the determined call linkage is one of a memory-based call linkage and a register-based call linkage.

23. The computer readable medium of claim 22 wherein, if the memory-based call linkage is selected for a particular procedure call, the running comprises:
allocating a block in a memory to store a value for each argument in the particular procedure call;
storing the value for each argument from a register in a processor to the block in the memory;
branching the procedure call to a callee procedure; and
loading the value for each argument from the block in the memory back to the register.

24. The computer readable medium of claim 22 wherein, if the register-based call linkage is selected for a particular procedure call, the running comprises:
copying a value, for each argument in a procedure call, from a register in the processor to a parameter register in the processor;
branching the procedure call to a callee procedure; and
copying the value from the parameter register back to the register.

25. The computer readable medium of claim 22 wherein the selecting comprises:
detecting whether an error exists for the procedure call;
selecting the memory based call linkage if the error is detected for the procedure call; and
selecting the registered based call linkage if no error is detected for the procedure call.

26. The computer readable medium of claim 21 wherein the extracting of procedure call information comprises:
extracting information for each procedure definition contained in the source code.

27. The computer readable medium of claim 26 wherein the extracted procedure call information comprises an identifier for a calling procedure and a callee procedure, and the extracted procedure definition information comprises a number of arguments received by the procedure and a classification for each argument.

28. The computer readable medium of claim 21 wherein the extracted information is generated in a data structure used to select the call linkage for each procedure call.

29. A computer readable medium containing information thereon, comprising:

a compiler program configured to generate an executable program from a plurality of source code modules, wherein the executable program is optimized by:

(i) extracting information for each procedure call contained in the plurality of source code modules, (ii) selecting, using the extracted information, a call linkage between a caller procedure and a callee procedure, wherein the selected call linkage is optimized to reduce a run time of object code modules generated from the source code modules by the compiler program, (iii) linking the object code modules according to the selected call linkage, and (iv) generating the executable program from the object code modules.

* * * * *